(12) United States Patent
Smeltzer et al.

(10) Patent No.: US 10,569,605 B1
(45) Date of Patent: Feb. 25, 2020

(54) RECEIVER-LESS HITCH FOR USE WITH A WINCH

(71) Applicants: Steve Norman Smeltzer, Spokane, WA (US); Norman Douglas Smeltzer, St. Maries, ID (US)

(72) Inventors: Steve Norman Smeltzer, Spokane, WA (US); Norman Douglas Smeltzer, St. Maries, ID (US)

( * ) Notice: Subject to any disclaimer, the term of this patent is extended or adjusted under 35 U.S.C. 154(b) by 0 days.

(21) Appl. No.: 16/275,314

(22) Filed: Feb. 13, 2019

(51) Int. Cl.
*B60D 1/52* (2006.01)
*B60D 1/06* (2006.01)
*B60D 1/00* (2006.01)

(52) U.S. Cl.
CPC ............. *B60D 1/52* (2013.01); *B60D 1/06* (2013.01); *B60D 2001/001* (2013.01)

(58) Field of Classification Search
CPC .................................. B60D 1/52; B60D 1/06
USPC ........................................................ 280/511
See application file for complete search history.

(56) References Cited

U.S. PATENT DOCUMENTS

| | | | | |
|---|---|---|---|---|
| 2,347,081 A * | 4/1944 | Caton | ............... | B60D 1/56 280/490.1 |
| 2,432,249 A * | 12/1947 | Pearson | ............... | B60R 9/06 224/500 |
| 2,542,907 A * | 2/1951 | Dayton | ............... | B60D 1/56 280/502 |
| 2,575,171 A * | 11/1951 | Hulse | ............... | B60D 1/52 280/501 |
| 2,818,277 A * | 12/1957 | McElhoe | ............... | B60D 1/52 280/491.1 |
| 3,011,800 A * | 12/1961 | Mitsuyasu | ............... | B60D 1/155 280/482 |
| 3,560,024 A * | 2/1971 | Abromavage | ............... | B60D 1/56 280/502 |
| 4,157,189 A * | 6/1979 | Poley | ............... | B60D 1/46 280/490.1 |
| 4,867,469 A * | 9/1989 | Freeman | ............... | B60D 1/56 280/502 |
| 5,052,604 A * | 10/1991 | Tourangeau | ............... | B62J 11/00 224/274 |
| 5,314,202 A * | 5/1994 | Wilkins, Jr. | ............... | B60D 1/38 280/292 |
| 5,350,029 A * | 9/1994 | Figueroa | ............... | B60D 1/52 180/11 |
| 2005/0028406 A1* | 2/2005 | Elliott | ............... | A01B 59/068 37/232 |
| 2007/0267846 A1* | 11/2007 | Carraway | ............... | B60D 1/46 280/495 |
| 2009/0189368 A1* | 7/2009 | Smith | ............... | B60D 1/07 280/477 |
| 2015/0266348 A1* | 9/2015 | Hauler | ............... | B60D 1/56 280/505 |
| 2019/0275851 A1* | 9/2019 | Steele, Jr. | ............... | B60D 1/06 |

* cited by examiner

*Primary Examiner* — Joseph M Rocca
*Assistant Examiner* — Conan D Duda

(57) ABSTRACT

A receiver-less hitch system has protrusion for hanging onto a vehicles brush guard and can pivot down to the vehicles winch. A hook is provided on the hitch system for connection to the end of the winch line and when retracted, tension on the winch line secures the hitch system to the vehicle. This quick and easy procedure provides a readily available front hitch system without the aid of a receiver or other mounting apparatus.

18 Claims, 2 Drawing Sheets

RECEIVER-LESS HITCH FOR USE WITH A WINCH

FIELD OF THE INVENTION

The present invention relates generally to hitch and ball systems connected to a vehicle for the general purpose of moving a trailer, or other towable unit, and more specifically to a receiver-less hitch and ball system for use on the front end of a vehicle, wherein the receiver-less hitch system is connectable to the vehicles brush guard, or similar rigid structure, and further connected and secured by the vehicles winch.

BACKGROUND OF THE INVENTION

The common and well-known receiver and hitch combination have been the primary means to connect to, and pull a variety of trailers and other towable units for many years. A receiver is generally attached just below the rear bumper and to the frame of a vehicle, and provides a sturdy mount for inserting and pinning a removable hitch and ball. A trailer will most generally have an elongated frame structure commonly referred to as a tongue, and the tongue will most generally have a coupler mechanism designed to fit securely over and pivot on a ball secured to the hitch. This procedure allows a trailer or other towable unit to be towed behind a vehicle during the course of travel.

While the most common configuration of a receiver and hitch combination is connected to the rear of a vehicle, it has long been known that a distinct and significant maneuvering advantage could be gained by applying the same procedure to the front-end of a vehicle. This technique can be very beneficial for inexperienced operators or in confined spaces as it enables an operator to see and react to movements of a trailer while traveling forward, as opposed to traveling in reverse and maneuvering the trailer with backup mirrors, or straining to view the trailer over one's shoulder.

Today vehicles such as ATV's and UTV's, are not only configured for recreation but are also well equipped for light duty utility work as well. The aforementioned receiver and hitch combination on these vehicles are frequently used to move small and medium size trailers around home properties, ranches, job sites, and recreation sites and the like. To gain the same maneuvering advantage, from a receiver and hitch combination on the front end of a vehicle, manufacturers began designing receivers and mounting brackets that could be installed around the vehicles brush guard and winch. Operators of these vehicles could then use a traditional hitch and ball with the receiver; however, a problem exist where the front of such vehicles have limited space for installing accessories, and since a front mount hitch is not the primary means for maneuvering a trailer, many operators will forgo this added benefit the front mount hitch has to offer.

The present invention addresses this dilemma by providing a readily available hitch and ball that does not require the aid of a receiver, or similar hitch receptacle. Instead, the hitch combines a vehicles brush guard and winch as a means to secure the hitch to the front end of a vehicle.

There have been many useful inventions designed for use with a receiver and many useful inventions designed for use with a hitch and ball, however; the new and useful hitch, of the disclosed invention, is different from prior art in that a hitch is designed for use without a common receiver.

BRIEF SUMMARY OF THE INVENTION

The following summary is provided to introduce the concept of the hitch in a simplified form. Key aspects and preferred embodiments of the invention will be more fully understood in the following detailed description and claims. Further, the summary is not intended for use as an aid in determining the scope of the claimed subject matter.

A vehicle, ATV or UTV, can have a rigid structure such as a brush guard, or grille guard, attached to the front frame to protect the vehicle in the event of a minor accident, or when traversing off-road. Additionally, the same vehicle can have a winch attached to the front frame for such things as recovering a stuck vehicle or moving a heavy object.

A preferred embodiment of the present invention is a hitch that can be quickly and easily attached and detached to the front end of a vehicle, by way of the vehicles brush guard and winch. This procedure provides a convenient and readily available front hitch.

The hitch can be summarized as a hitch comprising a vertical member, with a coupling member for attaching to a vehicles brush guard, or similar rigid structure. The coupling member can enable the hitch to hang freely over and around the brush guard and directly above a winch. A winch line can be attached to a hook on the vertical member and when retracted, the hitch is pulled firmly onto the brush guard and against the outermost structure of the winch, or vehicle. The winch can have vertical and horizontal roller fairleads that can provide components for securing the hitch to the vehicle, ATV or UTV.

A principal objective of the present invention is to provide a simple yet robust hitch that can be quickly and easily attached and detached to the front end of a vehicle, ATV or UTV, and further be compatible with a common hitch ball used for connection to a coupler associated with a trailer or other towable unit.

It is an objective of the present invention to provide a receiver-less front hitch for removeable attachment, and thereby eliminating additional weight and structure to the front-end of a vehicle, ATV or UTV for the purpose of connecting a hitch.

DETAILED DESCRIPTION OF THE INVENTION

Figure 1:
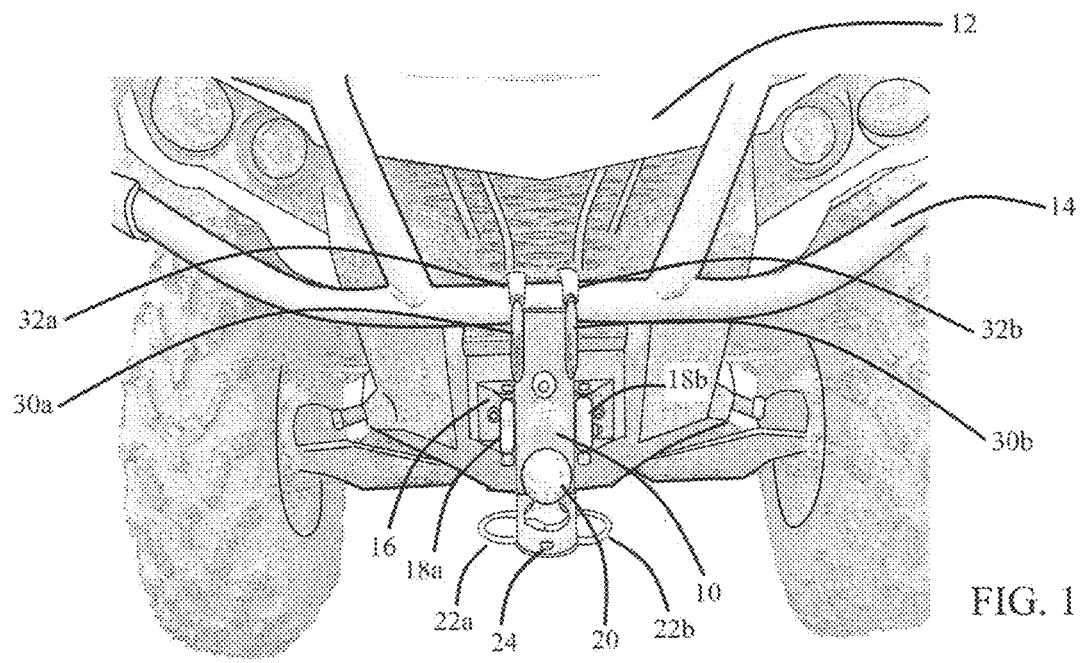
FIG. 1 is a front view of an exemplary ATV comprising, the hitch of the disclosed invention coupled to the front end of the ATV, according to the teachings of the present invention.

The present disclosure provides a hitch, for removable attachment, to a front end of a vehicle, ATV or UTV, wherein the hitch may be coupled to a trailer or other towable unit for maneuver.

In a preferred embodiment, the hitch comprises a coupling member, wherein the coupling member can be connected to a brush guard, or similar rigid structure, and further enable a pivot for union to a front end of a vehicle, ATV or UTV.

In another preferred embodiment, the hitch comprises an attachment such as a hook, wherein the hook enables a connection to a winch cable, connected to a winch, wherein the winch provides a force for a union of the hitch to a front end of a vehicle, ATV or UTV.

It will be understood by those skilled in the art that variations and equivalences may be made for elements thereof, without departing from the scope of the present teachings as defined in the claims. Elements of the disclosed invention, may originate from the group consisting of metal, steel or aluminum, or other suitable rigid material, and may be joined using a variety of welding processes, however; preferred embodiments of the present invention are not meant to be limited to a material or a joining process.

Referring now to the drawings, the hitch of the disclosed invention will be referred to by the reference numeral 10, and the reference numeral 12 will refer to an ATV, however; reference numeral 12 is not meant to limit the hitch to a specific vehicle.

Referring now to FIG. 1, hitch 10 is illustrated in exemplary orientation with exemplary ATV 12, wherein the ATV 12, comprising exemplary brush guard 14 and exemplary winch 16. It should be noted that although winch 16 is largely concealed from view, vertical roller fairleads 18*a*, 18*b* represent the outermost structure of winch 16, as it is common for a winch to be mounted in a recessed manner.

With further reference to FIG. 1, hitch 10 is illustrated in exemplary vertical position with respect to vertical and opposing roller fairleads 18*a*,18*b* and brush guard 14. Coupling members 30*a*, 30*b* are illustrated having exemplary union with brush guard 14 and cushion sleeves 32*a*, 32*b*. Cushion sleeves 32*a*, 32*b* can be slipped onto curved ends of coupling members 30*a*, 30*b* to provide a cushioning and gripping element between coupling members 30*a*, 30*b* and the brush guard 14. The hitch system 10 is further illustrated with a hitch ball 20, safety chain loops 22*a*, 22*b* and utility hole 24, as will be referenced further below.

Referring now to FIG. 2, hitch 10 is again illustrated in exemplary orientation with exemplary ATV 12. In this embodiment, winch cable 26 is illustrated protracted from winch 16 at an upward angle, with respect to the position of winch 16, and further connected to hook 28. A standard cable clamp 46 is attached to winch cable 26 for making a loop on one end of the winch cable 26 for attachment to the hook 28.

Figure 2:
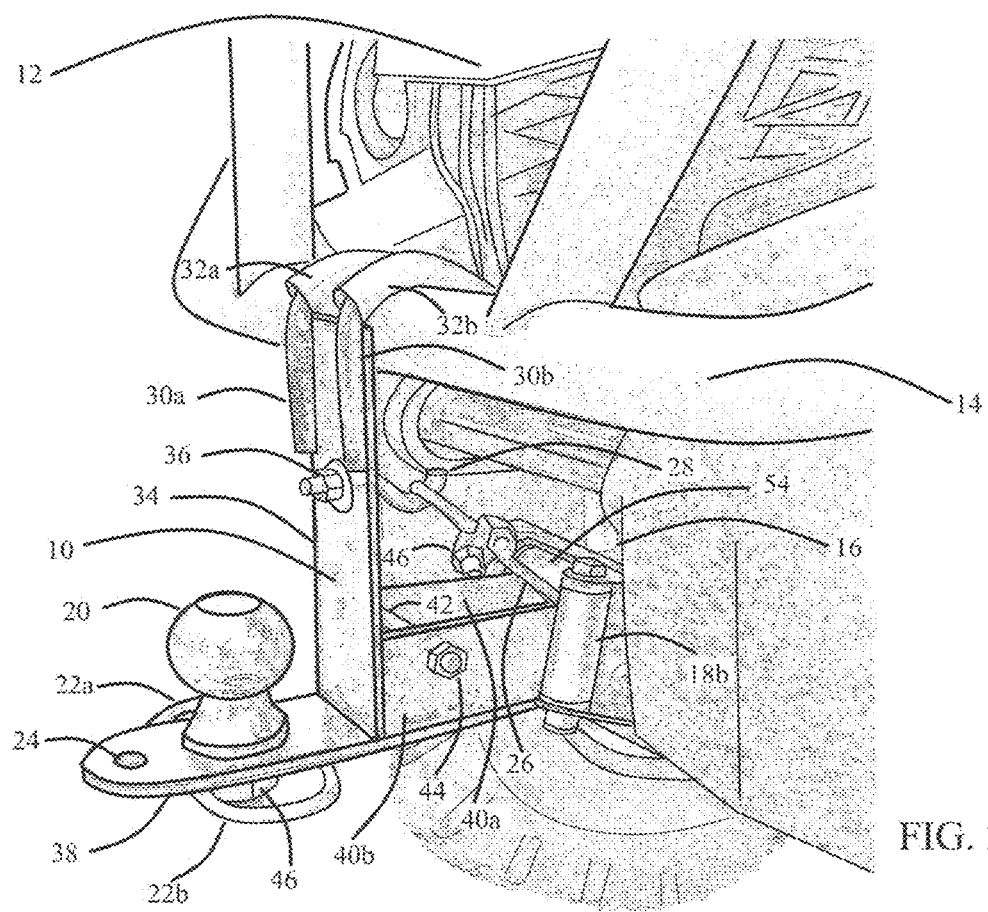
FIG. 2 is a front and side view of an exemplary hitch coupled to an ATV, according to the teachings of the present invention.

A force generated from winch 16 retracts winch cable 26, thereby pulling the hitch 10 in a downward and inward manner and towards ATV 12. Although not fully illustrated in the drawings, a winch can have a pair of inner horizontal and opposing roller fairleads. The top of one such inner horizontal roller fairlead 54 is illustrated just adjacently inward from vertical roller fairlead 18*b*. Tension on winch cable 26 can enable an extremely rigid attachment procedure and further secure the hitch 10 firmly onto brush guard 14 and in this form, against a pair of inner horizontal roller fairleads and between a pair of vertical roller fairleads. It should be noted that only the top of one such horizontal roller fairlead 54 and one vertical roller fairlead 18*b* are illustrated in FIG. 2. It is contemplated that a hitch coupled to a brush guard, or similar rigid structure, and further secured by a winch, can likely be coupled to a variety of solid outer surfaces of a winch or a vehicle, ATV or UTV.

With further reference to FIG. 2, coupling members 30*a*,30*b* can be attached to the top, and forward-facing end, of vertical member 34 and coupled to brush guard 14. Coupling members 30*a*, 30*b* enable hitch 10 to pivot on brush guard 14, and in alignment with respect to winch 16. Cushion sleeves 32*a*, 32*b* are shown slipped onto curved ends of coupling members 30*a*, 30*b* and in functional orientation with brush guard 14. Vertical member 34 can have an aperture for inserting a threaded end of hook 28 and further secured on the opposite side by retention fastener 36. Vertical member 34 can have elongated structure to extend downward from brush guard 14 and join to horizontal member 38 and spacer members 40*a*,40*b*. A top and forward-facing end of horizontal member 38 is illustrated with coupling to exemplary hitch ball 20, safety chain loops 22*a*, 22*b* and utility hole 24. Large retention fastener 46 is used in combination with a threaded end of hitch ball 20 and further for securing to horizontal member 38. Utility hole 24 is configured and made useful for inserting a variety of latch components that can be useful to couple auxiliary units to hitch 10. Additionally, on the forward-facing end of horizontal member 38, safety chain loops 22*a*, 22*b* enable a procedure for connecting safety chains typically attached near a coupler of a trailer or other towable unit. Spacer members 40*a*, 40*b* are joined to the bottom and rearward side of vertical member 34 and further joined on the rearward end and opposing top edges of horizontal member 38. Spacer members 40*a*, 40*b* can be of a preferred length and further enable a gusset between vertical member 34 and horizontal member 38.

With further reference to FIG. 2, bolt 42 is illustrated parallel between spacer members 40*a*, 40*b*. Spacer members 40*a*, 40*b* can have equal and opposing apertures for inserting bolt 42 through and out one side of spacer member 40*b*, wherein bolt 42 comprises a threaded end for attaching retention fastener 44. It is contemplated that bolt 42 can enable an additional procedure for attaching a winch cable and further securing hitch 10 to a vehicle, ATV or UTV. It is further contemplated that bolt 42 can be substituted with a rotational rod or other similar apparatus.

Further illustrated in FIG. 2, spacer members 40*a*, 40*b* joined to horizontal member 38 and vertical member 34, create a channel for winch cable 26 to extend unobstructed out and up for coupling to hook 28. The out and up extension of winch cable 26 enables a positive angle for transferring tension to hitch 10, wherein an operator can use a winch control mechanism to apply a volume of tension required to secure the hitch 10 to a vehicle, ATV or UTV.

Figure 3:
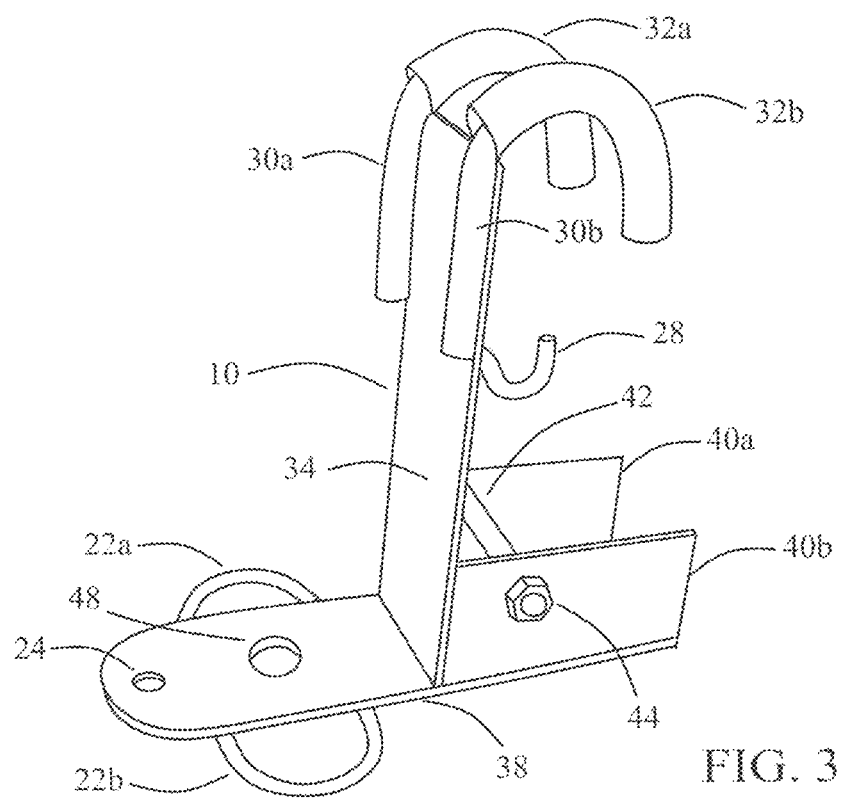
FIG. 3 is a front and side view of an exemplary hitch of the present invention.

Referring now to FIG. 3, a front and side view of exemplary hitch 10 comprises cushion sleeves 32*a*, 32*b* slipped onto curved ends of coupling members 30*a*,30*b*. Coupling members 30*a*, 30*b* are joined to the top and forward-facing end of vertical member 34 and vertical member 34 joined to horizontal member 38 and spacer members 40*a*, 40*b*. Hook 28 is illustrated in exemplary position and can be joined by a weld to vertical member 34. Utility hole 24 and ball hole 48 are illustrated in exemplary orientation with respect to horizontal member 38. Ball hole 48 enables the passage of a threaded end of a hitch ball for coupling with a retention fastener. Exemplary safety chains loops 22*a*, 22*b* are illustrated attached to horizontal member 38 and bolt 42 is illustrated between spacer members 40*a*, 40*b* and secured with retention fastener 44.

Figure 4:
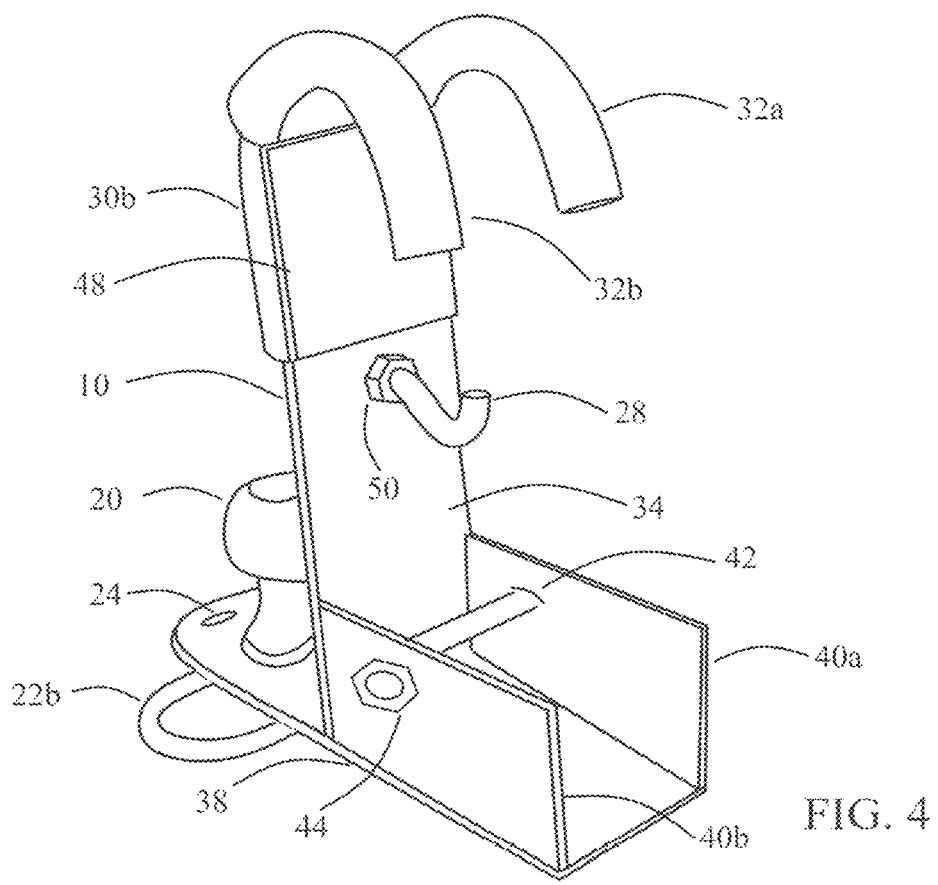
FIG. 4 is a back and side view of an exemplary hitch of the present invention.

Referring now to FIG. 4, a rear and side view of exemplary hitch 10 comprises cushion sleeves 32*a*, 32*b* slipped onto curved ends of coupling members 30*a*, 30*b*. Cushion pad 48 can be attached to the rear and top end of vertical member 34 and above hook 28. In this form, retention fastener 50 is provided to secure hook 28 to vertical plate 34 and tighten against opposing retention fastener 36 as previously illustrated in FIG. 2.

With further reference to FIG. 4, vertical member 34 is illustrated joined to horizontal member 38 and spacer members 40*a*, 40*b*. Bolt 42 is shown in exemplary position between spacer members 40*a*, 40*b* and secured on one end with retention fastener 44. Hitch ball 20 coupled to horizontal member 38. Safety chain loop 22b joined to horizontal member 38 and exemplary utility hole 24 configured on the forward end of horizontal member 38.

The forgoing is considered as illustrative only of the principles of the invention. Furthermore, since numerous variations and modifications will readily occur to those skilled in the art, it is not desired to limit the invention to the exact construction and operation shown and described. While preferred embodiments have been presented and described herein, the details may be changed without departing from the scope of the invention, which is defined by the attached claims.

The invention claimed is:

1. A hitch for removable attachment to a front of an all-terrain vehicle (ATV) or a utility vehicle (UTV), comprising:
   a vertical member having a first end and a second end, the first end at a top of the vertical member;
   a coupling member on the first end for making a temporary attachment of the vertical member to a brush guard or a front member of the ATV or the UTV, the temporary attachment enabling the vertical member to hang and pivot from the brush guard or from the front member of the ATV or the UTV; a first horizontal member attached to the second end of the vertical member, the first horizontal member comprising a ball mount for a hitch ball, and the first horizontal member disposed in a direction away from the ATV or the UTV with respect to the vertical member;
   at least one second horizontal member connected to the vertical member, the at least one second horizontal member providing a spacer between the vertical member and the ATV or the UTV, to hold the vertical member vertical with respect to the ATV or the UTV; and
   a hook attached to the vertical member to enable a winch cable of the ATV or the UTV to pull the vertical member toward the ATV or toward the UTV for securing the hitch to the ATV or to the UTV under a force provided by the winch cable when the second horizontal member comprising the spacer contacts a part of the ATV or the UTV; and
   wherein the spacer is spaced from and below the hook, the spacer is oriented vertically, and the spacer contacts and extends horizontally from the vertical member towards the ATV or the UTV.

2. The hitch of claim 1, further comprising a hitch ball attached to the first horizontal member comprising the ball mount.

3. The hitch of claim 1, further comprising one or more safety chain loops attached to the first horizontal member.

4. The hitch of claim 1, further comprising one or more utility holes in the first horizontal member for attaching auxiliary items to the hitch.

5. The hitch of claim 1, wherein the coupling member comprises a claw, a hook, a catch, a curved member, or a curved device for making the temporary attachment to the brush guard or to the front member of the ATV or the UTV.

6. The hitch of claim 1, further comprising a pad or a cushion on the coupling member intervening between the coupling member and the brush guard or the front member of the ATV or the UTV.

7. A hitch for removable attachment to a front of an all-terrain vehicle (ATV) or a utility vehicle (UTV), comprising:
   a vertical member having a first end and a second end, the first end at a top of the vertical member;
   a coupling member on the first end for making a temporary attachment of the vertical member to a brush guard or a front member of the ATV or the UTV, the temporary attachment enabling the vertical member to hang and pivot from the brush guard or from the front member of the ATV or the UTV; a first horizontal member attached to the second end of the vertical member, the first horizontal member comprising a ball mount for a hitch ball, and the first horizontal member disposed in a direction away from the ATV or the UTV with respect to the vertical member;
   at least one second horizontal member connected to the vertical member, the at least one second horizontal member providing a spacer between the vertical member and the ATV or the UTV, to hold the vertical member vertical with respect to the ATV or the UTV; and
   a rod attached to the vertical member to enable a winch cable of the ATV or the UTV to pull the vertical member toward the ATV or toward the UTV for securing the hitch to the ATV or to the UTV under a force provided by the winch cable when the second horizontal member comprising the spacer contacts a part of the ATV or the UTV; and
   wherein the spacer comprises at least two spacers, each of the at least two spacers are oriented vertically and extend horizontally from the vertical member towards the ATV or the UTV, each of the at least two spacers are spaced from one another and connected via the rod which extends between the at least two spacers, and the rod is spaced away from the vertical member.

8. The hitch of claim 7, further comprising a hitch ball attached to the first horizontal member comprising the ball mount.

9. The hitch of claim 7, further comprising one or more safety chain loops attached to the first horizontal member.

10. The hitch of claim 7, further comprising one or more utility holes in the first horizontal member for attaching auxiliary items to the hitch.

11. The hitch of claim 7, wherein the coupling member comprises a claw, a hook, a catch, a curved member, or a curved device for making the temporary attachment to the brush guard or to the front member of the ATV or the UTV.

12. The hitch of claim 7, further comprising a pad or a cushion on the coupling member intervening between the coupling member and the brush guard or the front member of the ATV or the UTV.

13. A hitch for removable attachment to a front of an all-terrain vehicle (ATV) or a utility vehicle (UTV), comprising:
   a vertical member having a first end and a second end, the first end at a top of the vertical member;
   a coupling member on the first end for making a temporary attachment of the vertical member to a brush guard or a front member of the ATV or the UTV, the temporary attachment enabling the vertical member to hang and pivot from the brush guard or from the front member of the ATV or the UTV; a first horizontal member attached to the second end of the vertical member, the first horizontal member comprising a ball mount for a hitch ball, and the first horizontal member disposed in a direction away from the ATV or the UTV with respect to the vertical member;
   at least one second horizontal member connected to the vertical member, the at least one second horizontal member providing a spacer between the vertical member and the ATV or the UTV, to hold the vertical member vertical with respect to the ATV or the UTV; and a hook or a rod attached to the vertical member to enable a winch cable of the ATV or the UTV to pull the vertical member toward the ATV or toward the UTV for securing the hitch to the ATV or to the UTV under a force provided by the winch cable when the second horizontal member comprising the spacer contacts a part of the ATV or the UTV; and wherein the spacer comprises at least two spacers, each of the at least two spacers are oriented vertically and extends horizontally from the vertical member towards the ATV or the UTV, the at least two spacers are spaced from one another and form a U-shaped channel in combination with the first horizontal member when viewed from a perspective towards the hitch from the ATV or the UTV, the U-shaped channel configured to receive a portion of the winch cable.

14. The hitch of claim 13, further comprising a hitch ball attached to the first horizontal member comprising the ball mount.

15. The hitch of claim 13, further comprising one or more safety chain loops attached to the first horizontal member.

16. The hitch of claim 13, further comprising one or more utility holes in the first horizontal member for attaching auxiliary items to the hitch.

17. The hitch of claim 13, wherein the coupling member comprises a claw, a hook, a catch, a curved member, or a curved device for making the temporary attachment to the brush guard or to the front member of the ATV or the UTV.

18. The hitch of claim 13, further comprising a pad or a cushion on the coupling member intervening between the coupling member and the brush guard or the front member of the ATV or the UTV.

* * * * *